US009124088B2

(12) United States Patent  
Ikeda

(10) Patent No.: US 9,124,088 B2
(45) Date of Patent: Sep. 1, 2015

(54) ELECTROSTATIC DISCHARGE PROTECTION CIRCUIT AND SEMICONDUCTOR CIRCUIT DEVICE

(71) Applicant: SEIKO EPSON CORPORATION, Tokyo (JP)

(72) Inventor: Masuhide Ikeda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 22 days.

(21) Appl. No.: 14/134,239

(22) Filed: Dec. 19, 2013

(65) Prior Publication Data

US 2014/0192445 A1 Jul. 10, 2014

(30) Foreign Application Priority Data

Jan. 7, 2013 (JP) ................. 2013-000359

(51) Int. Cl.
*H02H 9/00* (2006.01)
*H02H 9/04* (2006.01)
*H01C 7/12* (2006.01)
*H02H 1/00* (2006.01)
*H02H 1/04* (2006.01)
*H02H 3/22* (2006.01)

(52) U.S. Cl.
CPC .................. *H02H 9/046* (2013.01)

(58) Field of Classification Search
USPC .......................................... 361/56
See application file for complete search history.

(56) References Cited

U.S. PATENT DOCUMENTS

| 5,781,388 | A | 7/1998 | Quigley |
| 2006/0039093 | A1 | 2/2006 | Gauthier, Jr. et al. |
| 2006/0209478 | A1* | 9/2006 | Arai et al. ................ 361/56 |
| 2010/0296212 | A1* | 11/2010 | Liang et al. ............... 361/56 |

FOREIGN PATENT DOCUMENTS

| JP | A 10-134988 | 5/1998 |
| JP | A 2005-197980 | 7/2005 |
| JP | A 2006-261427 | 9/2006 |
| JP | A 2009-21332 | 1/2009 |
| JP | A 2009-147040 | 7/2009 |
| JP | A 2009-182119 | 8/2009 |

* cited by examiner

*Primary Examiner* — Dharti Patel
(74) *Attorney, Agent, or Firm* — Oliff PLC

(57) ABSTRACT

The invention provides an electrostatic protection circuit that is effective in absorbing static electricity that is continuously input. The electrostatic protection circuit includes a circuit constituting a latch and a static electricity absorption circuit. When static electricity is input, the static electricity absorption circuit maintains its on state for a while at an output held by the latch circuit, and absorbs static electricity that is continuously input. When the static electricity has been absorbed, the output of the latch is inverted so as to turn off the static electricity absorption circuit, and the operation of absorbing static electricity ends. At this point in time, normal operation serving as an input terminal is performed.

18 Claims, 8 Drawing Sheets

ELECTROSTATIC DISCHARGE PROTECTION CIRCUIT AND SEMICONDUCTOR CIRCUIT DEVICE

BACKGROUND

1. Technical Field

The present invention relates to an electrostatic discharge protection circuit for protecting a semiconductor integrated circuit from electrostatic discharge, and a semiconductor circuit device.

2. Related Art

When electric charges generated by electrostatic discharge (ESD) are applied to a semiconductor integrated circuit, elements incorporated in the semiconductor integrated circuit may be damaged. To address this, a technique has been proposed to protect the elements in the semiconductor integrated circuit by providing an electrostatic discharge protection circuit to the semiconductor integrated circuit, and discharging the electric discharges generated by ESD by using the electrostatic discharge protection circuit.

FIG. 10 is a diagram showing a configuration of an electrostatic discharge protection circuit proposed by US-A1-2006/0039093.

The electrostatic discharge protection circuit shown in FIG. 10 is included in a semiconductor integrated circuit. The electrostatic discharge protection circuit, which is connected to a direct-current power supply (not shown), includes a first power supply line 1100-1 having a power supply voltage potential VDD and a second power supply line 1100-2 having a potential VSS that is lower than the potential VDD. The second power supply line 1100-2 is connected to a frame ground GND.

The electrostatic discharge protection circuit also includes a time constant circuit 1101 composed of a resistor 1101a and a capacitor 1101b that are connected in series between the first power supply line 1100-1 and the second power supply line 1100-2.

The electrostatic discharge protection circuit also includes a relatively large-sized N-channel transistor 1102 that is connected between the first power supply line 1100-1 and the second power supply line 1100-2.

The electrostatic discharge protection circuit also includes three inverters 1103, 1104 and 1105 that are connected in series between a connection node located between the resistor 1101a and the capacitor 1101b and a gate of the N-channel transistor 1102.

An ESD event occurs due to electrostatic electricity being charged on the human body or a transporting device during transport of a semiconductor integrated circuit and flowing through the semiconductor integrated circuit. At first, the first power supply line 1100-1 has a potential equal to that of the second power supply line 1100-2. It is assumed here that, as an ESD event, positive ESD surge is applied to the first power supply line 1100-1 relative to the second power supply line 1100-2. Electric charges generated by the ESD surge are charged into the capacitor 1101b via the resistor 1101a. Here, the value of an RC time constant determined by the resistance value of the resistor 1101a and the capacitance value of the capacitor 1101b is large enough that an input-side node of the inverter 1103 is maintained at 'L' level during a time period corresponding to the RC time constant. In a state in which the input-side node of the inverter 1103 is maintained at 'L' level, the gate of the N-channel transistor 1102 is at 'H' level via the inverters 1104 and 1105. Accordingly, the N-channel transistor 1102 is brought into an ON state. In this way, as a result of the surge current escaping through the N-channel transistor 1102, it is possible to prevent high voltage from being applied between the first power supply line 1100-1 and the second power supply line 1100-2. Note that the gate potential of the N-channel transistor 1102 decreases together with the ESD surge.

However, the electrostatic discharge protection circuit shown in FIG. 10 is problematic in that the proportion of a circuit area occupied by the capacitor and the resistive element needs to be increased in order to increase the RC time constant.

FIG. 11 is a diagram showing a configuration of an electrostatic discharge protection circuit proposed by JP-A-2009-182119.

The electrostatic discharge protection circuit shown in FIG. 11, which is connected to a direct-current power supply, includes a first power supply line 1200-1 having a predetermined first potential and a second power supply line 1200-2 having a second potential that is lower than the first potential, as well as a time constant circuit 1210 that includes a capacitor 1212 on the first power supply line 1200-1 side and a first N-channel transistor 1214 on the second power supply line 1200-2 side having a negative threshold voltage, which are connected in series between the first power supply line 1200-1 and the second power supply line 1200-2, an inverter 1220 whose input side is connected to a connection node 1216 located between the capacitor 1212 and the first N-channel transistor 1214 and whose output side is connected to a gate of the first N-channel transistor 1214, and a field effect transistor 1240 that is connected between the first power supply line 1200-1 and the second power supply line 1200-2, whose gate is indirectly connected to the connection node 1216 located between the capacitor 1212 and the first N-channel transistor 1214, and that conducts electricity in response to an increase in the potential of the gate by an increase in the potential of the connection node 1216.

Upon receiving the occurrence of an ESD event, the potential of the connection node 1216 located between the capacitor 1212 and the first N-channel transistor 1214 having a negative threshold increases sharply, and 'L' level is output from the inverter 1220. The 'L' level is input into the gate of the first N-channel transistor 1214. Accordingly, the value of on-resistance of the first N-channel transistor 1214 is large, and thus the first N-channel transistor 1214 functions as a high resistor that constitutes, together with the capacitor 1212, a RC time constant circuit. Also, the 'L' level is indirectly input into the gate of the field effect transistor 1240, and the field effect transistor 1240 is thereby brought into an ON state, which allows the surge current due to the ESD event to escape. As described above, in the invention of JP-A-2009-182119, the N-channel transistor is in the ON state only during a time period corresponding to the value of RC time constant determined by a product between the value of the capacitor 1212 and the value of on-resistance of the N-channel transistor 1214 (for example, a value on the order of several MΩ by input of the 'L' level), and the surge current due to the ESD event is discharged during that time period.

The electrostatic discharge protection circuit shown in FIG. 11 is a circuit invented by improving the problems of the electrostatic discharge protection circuit shown in FIG. 10. Although the capacitor size can be reduced, the electrostatic discharge protection circuit shown in FIG. 11 is problematic in that the first N-channel transistor 1214 is a depression type transistor, and thus a step of performing channel doping is required, causing an increase in the cost.

Also, in both FIGS. 10 and 11, the ON time of the N-channel transistor connected between power supply lines is determined by the RC time constant. Therefore, a problem arises in that if ESD events occur sequentially in a short time, for example, electric charges generated by electrostatic discharge are further injected during storage of electric charges into the capacitor, the N-channel transistor is brought into an OFF state while the N-channel transistor is not sufficiently discharged, and the potential increases to cause electric charges to flow into an internal circuit, which may result in breakdown.

Also, in the electrostatic discharge protection circuit shown in FIG. 10, there are three inverters between the capacitor 1101b and the N-channel transistor 1102 connected between the power supply lines. In the electrostatic discharge protection circuit shown in FIG. 11, there are two inverters between the capacitor 1212 and the N-channel transistor 1240. In both of the electrostatic discharge protection circuits, there is a problem in that because it takes time from the reception of the occurrence of an ESD event until the N-channel transistor is turned on, electric charges flow into the internal circuit, which may result in breakdown.

SUMMARY

The invention has been made in view of the problems as described above, and according to aspects of the invention, it is possible to provide an electrostatic discharge protection circuit that can sufficiently and exhaustively discharge electric charges generated by electrostatic discharge by using a simple circuit configuration.

(1) An aspect of the invention relates to an electrostatic discharge protection circuit including: a first line having a first potential; a second line having a second potential that is different from the first potential; a trigger circuit connected between the first line and the second line; and a discharge circuit including a field effect transistor that is connected between the first line and the second line, whose gate is directly or indirectly connected to a predetermined connection node of the trigger circuit, and that conducts electricity by a change in a potential of the gate. The trigger circuit includes a first circuit and a second circuit that are connected in parallel. The first circuit includes: a first impedance element on the first line side and a capacitor element on the second line side that are connected in series between the first line and the second line; and a first transistor of first conductivity type that is connected in series to the first impedance element and is connected in parallel to the capacitor element. The second circuit includes: a first transistor of second conductivity type on the first line side and a second impedance element on the second line side that are connected in series between the first line and the second line. A gate of the first transistor of second conductivity type is connected to a first node located between the first impedance element and the capacitor element, a gate of the first transistor of first conductivity type is connected to a second node located between the first transistor of second conductivity type and the second impedance element, and the predetermined connection node is the first node or the second node.

The invention also relates to a semiconductor circuit device including the electrostatic discharge protection circuit.

The first conductivity type transistor and the second conductivity type transistor are field effect transistors (FET), but they may be MOS type field effect transistors (depression type or enhancement type), or junction type field effect transistors. The field effect transistor of the discharge circuit may be a P-channel transistor or an N-channel transistor.

In the electrostatic discharge protection circuit according to the invention, the second conductivity type transistor (for example, a P-channel transistor) transitions from an OFF state to an ON state as a result of an action of the first impedance element and the capacitor element, and once the second conductivity type transistor is brought into the ON state, the second conductivity type transistor maintains the ON state while the potential of the first line is higher than that of the second line, regardless of the RC time constant. Therefore, even if electric charges generated by electrostatic discharge are injected due to the occurrence of a new ESD event during discharge of electric charges, or ESD events occur sequentially in a short time, the electrostatic discharge protection circuit can maintain the ON state and perform electrostatic discharge. As described above, according to an aspect of the invention, it is possible to provide an electrostatic discharge protection circuit and a semiconductor circuit device that can sufficiently and exhaustively discharge electric charges generated by electrostatic discharge by using a simple circuit configuration.

(2) In the electrostatic discharge protection circuit and the semiconductor circuit device, the discharge circuit may be configured to include a second transistor of first conductivity type as the field effect transistor, and the second transistor of first conductivity type may be configured to conduct electricity by an increase in a potential of the first node or the second node.

(3) In the electrostatic discharge protection circuit and the semiconductor circuit device, the first impedance element may be constituted by a resistive element.

(4) In the electrostatic discharge protection circuit and the semiconductor circuit device, the second impedance element may be constituted by a resistive element.

(5) In the electrostatic discharge protection circuit and the semiconductor circuit device, the first impedance element may be constituted by a second transistor of second conductivity type whose gate is connected to the second line. The second transistor of second conductivity type may be a PMOS structure transistor.

(6) In the electrostatic discharge protection circuit and the semiconductor circuit device, the second impedance element may be constituted by a third transistor of first conductivity type whose gate is connected to the first line. The third transistor of first conductivity type may be an NMOS structure transistor.

(7) In the electrostatic discharge protection circuit and the semiconductor circuit device, the capacitor element may be constituted by a fourth transistor of first conductivity type whose gate is connected to the first node. The fourth transistor of first conductivity type may be an NMOS structure transistor.

(8) The electrostatic discharge protection circuit and the semiconductor circuit device may further include an inverter circuit whose input side is connected to the first node and whose output side is connected to the gate of the field effect transistor in the discharge circuit.

(9) In the electrostatic discharge protection circuit and the semiconductor circuit device, a configuration may be used in which an impedance value of the first impedance element and a capacitance value of the capacitor element satisfy a predetermined condition that is set based on a relationship between the impedance value and the capacitance value that are set based on a power supply rise time during normal operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of the invention will be described in detail with reference to the drawings. It is to be understood that the embodiments described below are not intended to unduly limit the scope of the invention recited in the claims. It is also understood that all of the constituent elements described below are not necessarily essential to the invention.

1. First Embodiment

Figure 1:
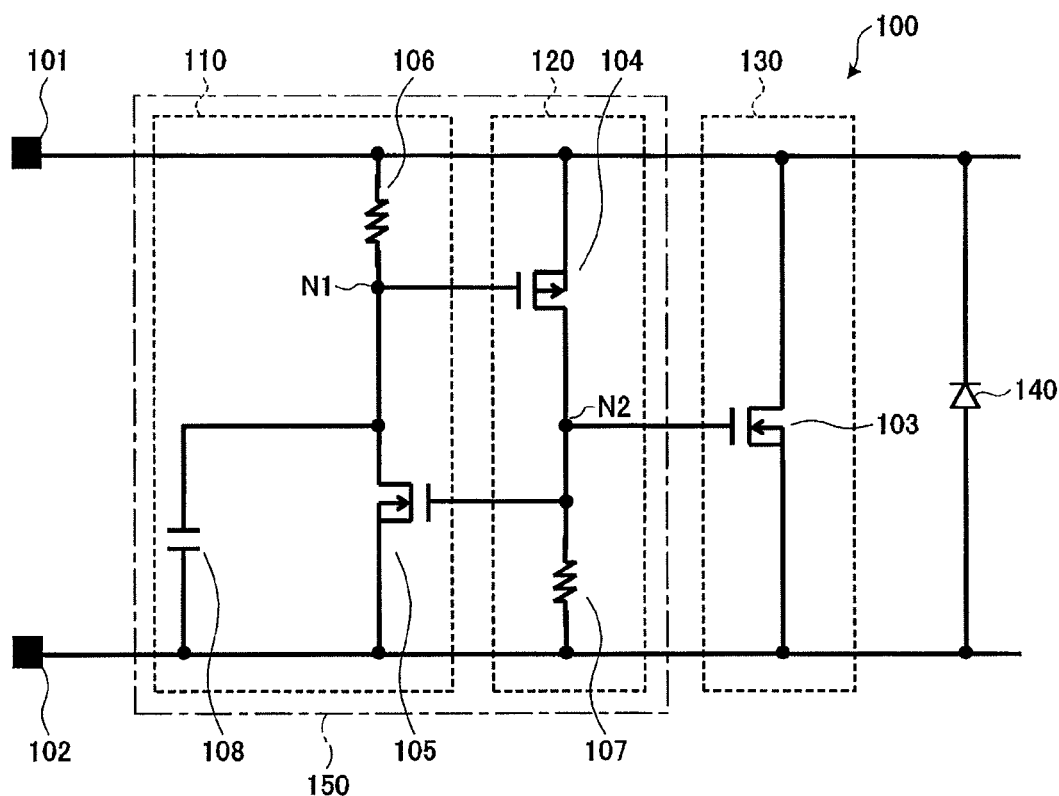
FIG. 1 is a diagram showing a configuration of an electrostatic discharge protection circuit according to a first embodiment of the invention.

FIG. 1 is a diagram showing a configuration of an electrostatic discharge protection circuit according to a first embodiment.

An electrostatic discharge protection circuit 100 according to the first embodiment includes a first line 101 having a first potential, and a second line 102 having a second potential that is lower than the first potential. The first line 101 and the second line 102 may be power supply lines connected to, for example, VDD, VSS and the like, or terminal lines connected to input terminals.

The electrostatic discharge protection circuit 100 includes a trigger circuit 150 connected between the first line 101 and the second line 102, and a discharge circuit 130 including a field effect transistor 103 that is connected between the first line 101 and the second line 102, whose gate is directly or indirectly connected to a predetermined connection node of the trigger circuit, and that conducts electricity by a change in the potential of the gate.

The trigger circuit 150 includes a first circuit 110 and a second circuit 120 that are connected in parallel. The first circuit 110 includes a first impedance element 106 on the first line 101 side and a capacitor element 108 on the second line 102 side that are connected in series between the first line 101 and the second line 102. The first circuit 110 also includes a first N-channel transistor 105 that is connected in series to the first impedance element 106 and is connected in parallel to the capacitor element 108.

The second circuit 120 includes a P-channel transistor 104 on the first line 101 side and a second impedance element 107 on the second line 102 side that are connected in series between the first line 101 and the second line 102. The gate of the P-channel transistor 104 is connected to a first node N1 located between the first impedance element 106 and the capacitor element 108, and the gate of the first N-channel transistor 105 is connected to a second node N2 located between the P-channel transistor 104 and the second impedance element 107. In this example, the predetermined connection node is the first node N1 or the second node N2.

The discharge circuit 130 includes an N-channel transistor as the field effect transistor 103, and the N-channel transistor 103 may be configured to conduct electricity in response to an increase in the potential of the first node N1 or the second node N2.

The first impedance element 106 may be constituted by a resistive element. The second impedance element 107 may also be constituted by a resistive element. The capacitor element 108 may be constituted by a capacitor. The first N-channel transistor 105 and the field effect transistor 103 may be constituted by NMOS transistors. The P-channel transistor 104 may be constituted by a PMOS transistor.

Also, a diode 140 whose cathode is connected to the first line 101 and whose anode is connected to the second line 102 may be included. By doing so, when, as an ESD event, positive ESD surge is applied to the second line 102 relative to the first line 101, electric charges generated by ESD surge can be allowed to flow into the first line 101 via the diode 140. Accordingly, it is possible to prevent high voltage from being applied between the second line 102 and the first line 101.

A description will be given of operations performed when positive static electricity is applied to the first power supply line 101 relative to the second power supply line 102. In order to simplify the description, it is assumed that the potential of the second power supply line 102 is 0 V. It is also assumed that the resistive element 107 has a resistance value that is sufficiently greater than that of the resistive element 106.

In a first step, the potential of the power supply line 101 increases sharply from 0 V. In a second step, capacitive coupling of the capacitor element 108 prevents the gate potential of the P-channel transistor 104 from increasing from 0 V, and thereby the P-channel transistor 104 is turned on. In a third step, current flows through the second impedance element 107, and the gate potentials of the first N-channel transistor 105 and the field effect transistor 103 increase. In a fourth step, the first N-channel transistor 105 is turned on, and thereby current flows through the first impedance element 106, and the gate potential of the P-channel transistor 104 decreases to 0 V. At the same time, current also starts flowing through the field effect transistor 103. In a fifth step, the amount of current flowing through the P-channel transistor 104 further increases to increase the amount of current flowing through the second impedance element 107, and as a result, the gate potentials of the first N-channel transistor 105 and the field effect transistor 103 reach the same potential as that of the first power supply line 101. At the same time, large current continues to flow through the field effect transistor 103. In a sixth step, the potential of the first power supply line 101 decreases by electrostatic discharge, and at the same time, the on-resistance of the P-channel transistor 104 and the first N-channel transistor 105 increases. When the on-resistance of the first N-channel transistor 105 is around the same as the resistance value of the first impedance element 106, the drain potential of the first N-channel transistor 105 increases, and the P-channel transistor 104 is turned off. At the same time, the gate potentials of the field effect transistor 103 and the first N-channel transistor 105 also decrease, and the transistors are turned off.

In the foregoing, for the sake of simplifying the description, the description was given assuming that the second impedance element 107 has a resistance value that is sufficiently greater than that of the first impedance element 106, but when the resistance value of the first impedance element 106 is greater than that of the second impedance element 107, the same operations are performed except that the order in which the transistors are turned off is changed in the sixth step.

According to the operations of the first to fifth steps, in the electrostatic discharge protection circuit 100 according to the first embodiment, the P-channel transistor 104, the first N-channel transistor 105 and the field effect transistor 103 transition from an OFF state to an ON state as a result of an action of the resistive element 106 and the capacitor element 108. Once the transistors are brought into the ON state, the transistors maintain the ON state while the potential of the first power supply line 101 is high, regardless of the RC time constant. Therefore, even if electric charges generated by electrostatic discharge are injected due to the occurrence of a new ESD event during discharge of electric charges, or ESD events occur sequentially in a short time, the electrostatic discharge protection circuit can maintain the ON state and perform electrostatic discharge.

The N-channel transistor and the P-channel transistor may be constituted by MOS transistors of the same type (having equal Vth, etc.). This eliminates the need to add a new process step, and thus the cost can be reduced.

In addition, because there is only one circuit element of the P-channel transistor 104 between the capacitor element 108 and the field effect transistor 103, the response time from the reception of the occurrence of an ESD event until the field effect transistor 103 is turned on is short.

Also, the capacitor element 108 and the first impedance element 106 have the same high-pass filter circuit configuration as that of the conventional techniques. That is, the first line 101 can be regarded as measurement GND, the second line 102 can be regarded as signal input, and an input unit of the P-channel transistor 104 can be regarded as signal output. Accordingly, the cut-off frequency is determined by $f(C, R)=1 \div (2\pi RC)$. For example, if it is assumed that the capacitance value of the capacitor element 108 is C=1 pF, and the resistance value of the first impedance element 106 is R=2 kΩ, the cut-off frequency is $f(C=1\ pF, R=2\ k\Omega) \approx 79.6$ MHz. That is, the capacitor element and the resistive element are smaller than those of the conventional technique (FIG. 10), and thus the circuit area can also be reduced.

Figure 5:
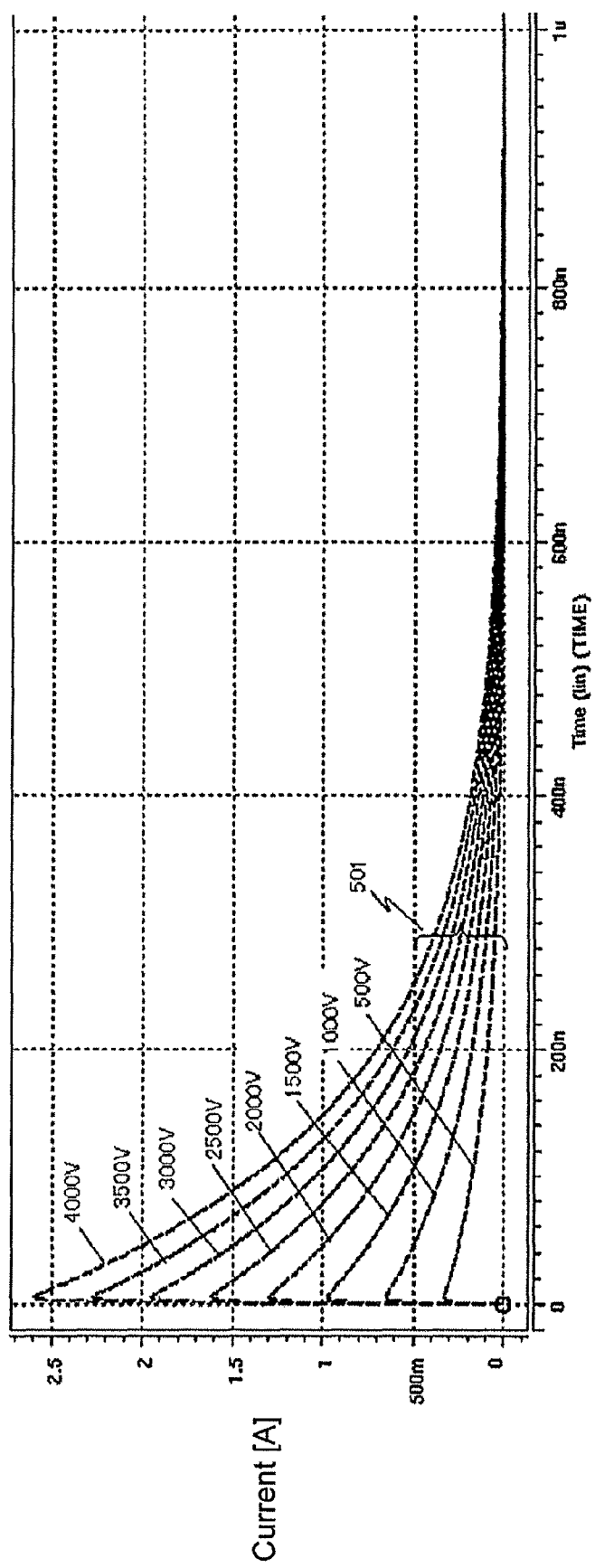
FIG. 5 is a graph showing current waveforms in a human body model.

FIG. 5 is a graph showing current waveforms 501 in a human body model. When, for example, 2000 V is applied, a peak current of approximately 1.3 A flows. Also, it takes about 1 usec until all electric charges are discharged. For this reason, in the case of electrostatic discharge protection circuits as shown in FIGS. 10 and 11 in which the on-time of the N-channel transistor (1102 in FIG. 10, or 1240 in FIG. 11) is set based on the RC time constant, it is desirable that the time constant is approximately 1 usec.

Figure 6:
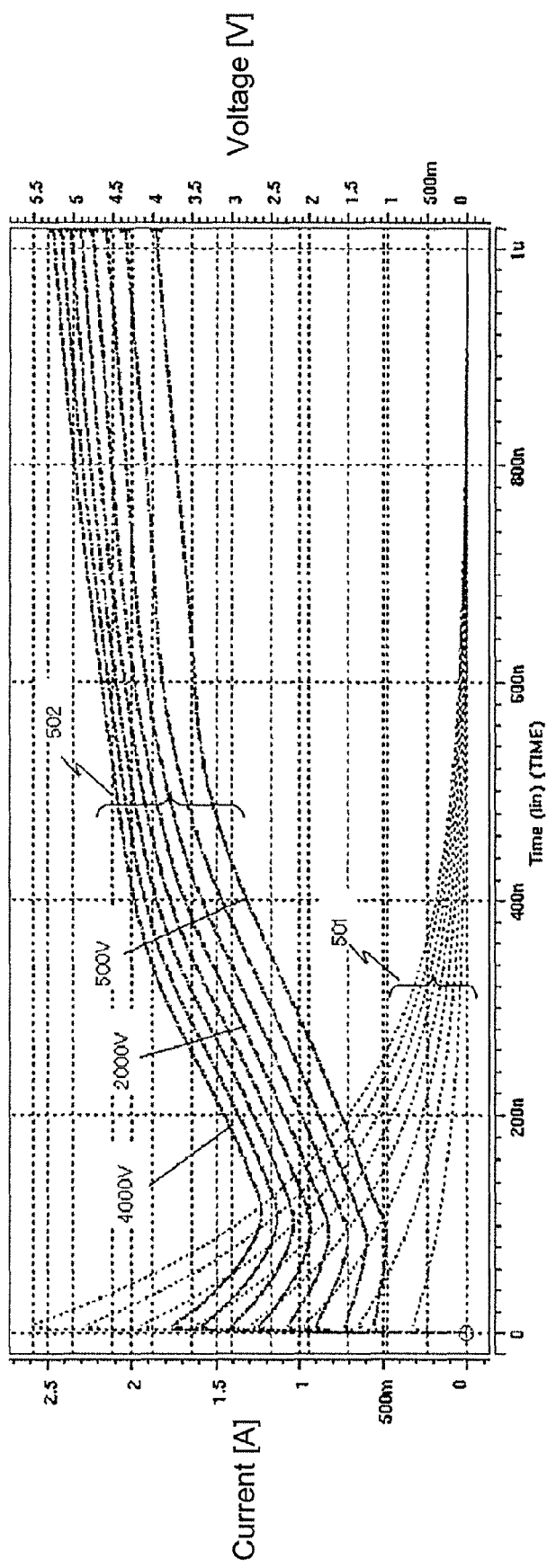
FIG. 6 is a graph showing current waveforms and voltage waveforms obtained when the following settings are used in FIG. 10: C=2 pF, R=100 KΩ, and time constant t=2 pF×100 kΩ=200 nsec.
Figure 10:
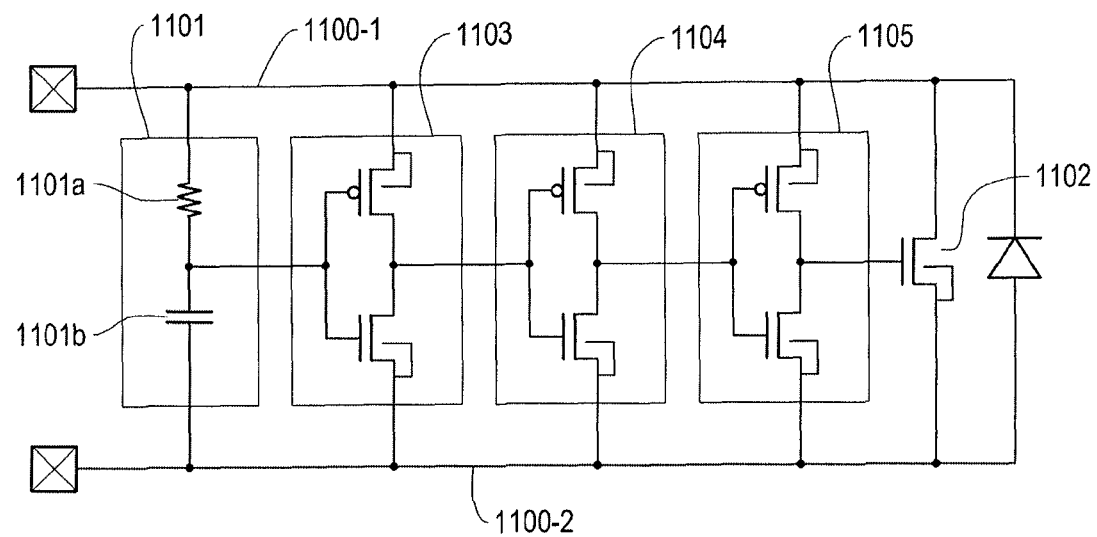
FIG. 10 is a diagram showing a configuration of an electrostatic discharge protection circuit according to a conventional technique.
Figure 11:
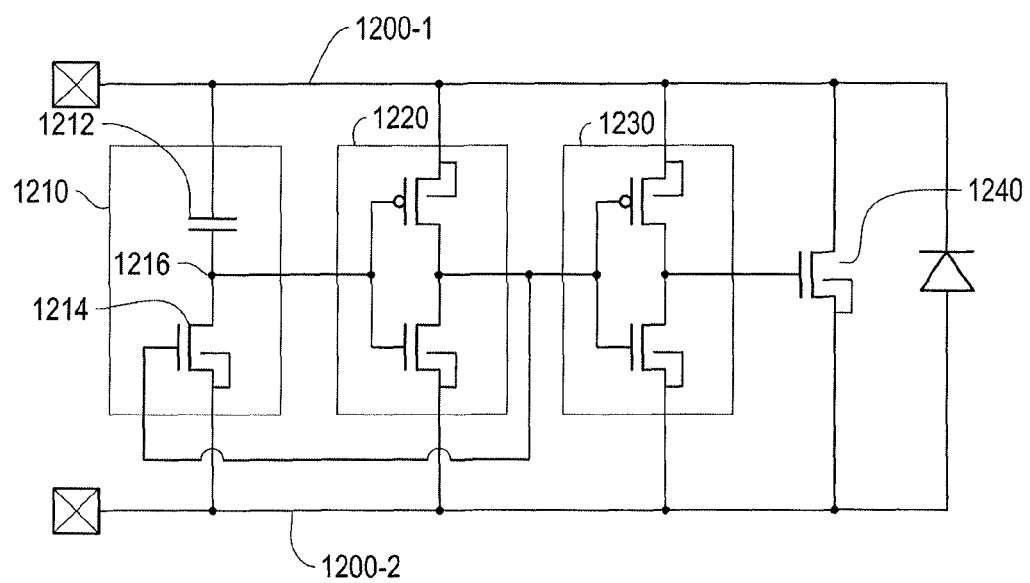
FIG. 11 is a diagram showing a configuration of an electrostatic discharge protection circuit according to a conventional technique.

FIG. 6 is a graph showing the result of simulation of the current waveforms 501 in the human body model and voltage waveforms 502 obtained when the following settings are used in the electrostatic discharge protection circuit shown in FIG. 10: C=2 pF, R=100 kΩ, and time constant t=2 pF×100 kΩ=200 nsec. The electrostatic discharge protection circuit used in the simulation is intended to protect an internal circuit having a maximum operating voltage of 2.5 V. At the timing of approximately 100 nsec, the N-channel transistor 1102 is turned off, and the voltage waveforms change from decreasing to increasing and consequently exceed a maximum operating voltage of 2.5 V, from which it can be seen that the value of the RC time constant is small and thus not appropriate.

Figure 7:
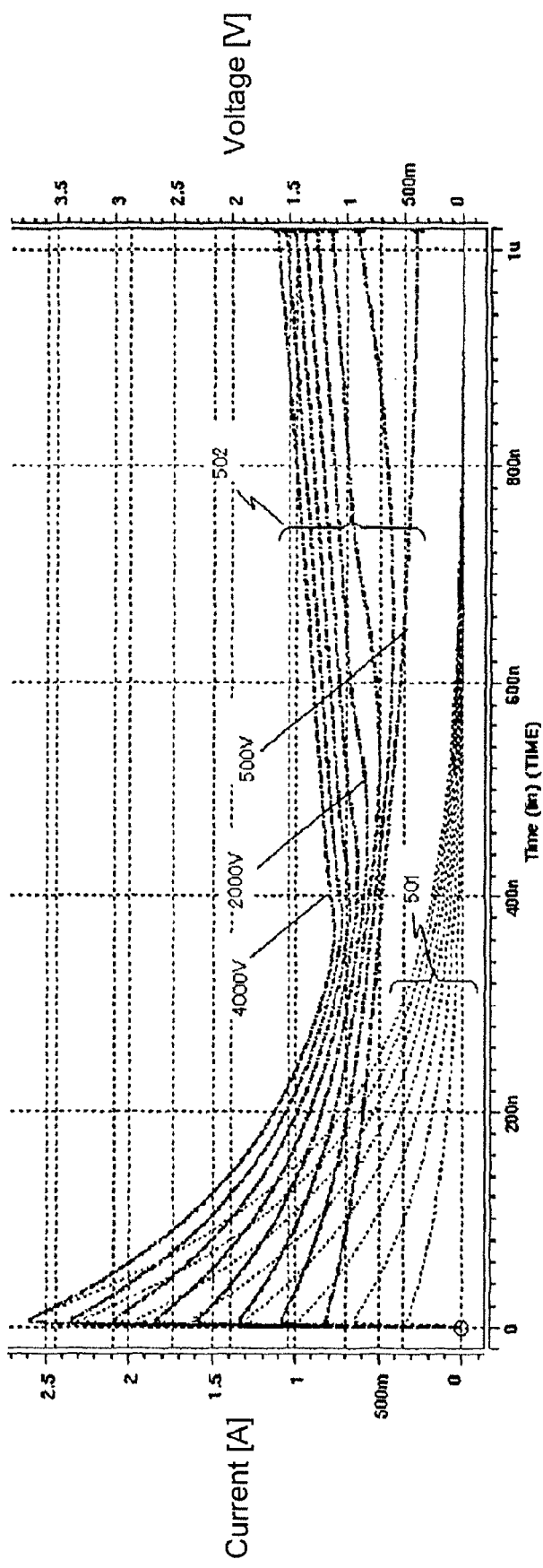
FIG. 7 is a graph showing current waveforms and voltage waveforms obtained when the following settings are used in FIG. 10: C=4 pF, R=300 kΩ, and time constant t=4 pF×300 kΩ=1.2 usec.

FIG. 7 is a graph showing the result of simulation of the current waveforms 501 in the human body model and voltage waveforms 502 obtained when the following settings are used in the electrostatic discharge protection circuit shown in FIG. 10: C=4 pF, R=300 kΩ, and time constant t=4 pF×300 kΩ=1.2 usec. The electrostatic discharge protection circuit used in the simulation is intended to protect an internal circuit having a maximum operating voltage of 2.5 V. At any applied voltage, the maximum operating voltage of 2.5 V is not exceeded, which does not cause breakdown of the internal circuit. However, the applied waveforms start increasing as the applied voltage is increased. In such a state, if a second ESD event is externally caused, the on-time of the NMOS is shortened by an amount corresponding to the electric charges stored into the capacitor, as compared to the first ESD event.

In the electrostatic discharge protection circuit shown in FIG. 10, the RC circuit 1101 has a high-pass filter circuit configuration. That is, 1100-1 can be regarded as measurement GND, 1100-2 can be regarded as signal input, and an input unit of the inverter 1103 can be regarded as signal output. Accordingly, the cut-off frequency is determined by $f(C, R)=1 \div (2\pi RC)$. For example, when the time constant is set to 1 usec (C=4 pF, R=250 kΩ), the cut-off frequency is $f(C=4\ pF, R=250\ k\Omega)$ 159 kHz. That is, when a signal having a frequency greater than or equal to the above-described cut-off frequency is added to the power supply line, the signal is sent to the gate of the inverter 1103, satisfying a requirement for the operation of the electrostatic discharge protection circuit.

On the other hand, power supply ICs for supplying power to LSIs are known as products having a relatively short power supply rise time of 300 nsec/V. For example, in the case where a power supply of 2.5 V is shared, the power supply rises in 750 nsec, corresponding to a frequency of 1.33 MHz, which exceeds the above-described cut-off frequency. This indicates that the electrostatic discharge protection circuit may be operated.

The electrostatic discharge protection circuit shown in FIG. 11 also has a high-pass filter circuit configuration.

It can be seen from the foregoing that in the electrostatic discharge protection circuits shown in FIGS. 10 and 11, in order to have a time constant of approximately 1 usec, the cut-off frequency of the high-pass filter needs to be set to 159 kHz, surge current is generated by the ESD protection circuit performing operation when the power supply rises or when the value of the power supply varies, and with respect to noise containing a component of 159 kHz, the signal is sent to the inside of the IC, causing a malfunction.

It is known that the rise time at the time of application of static electricity in the human body model is relatively long, as long as approximately 10 nsec. The rise time of 10 nsec corresponds to a frequency of 100 MHz, which is far higher than the cut-off frequency shown in FIGS. 6 and 7, and thus the electrostatic discharge protection circuit performs operation.

The cut-off frequencies of the electrostatic discharge protection circuit used in FIGS. 6 and 7 are as follows.

Figure 8:
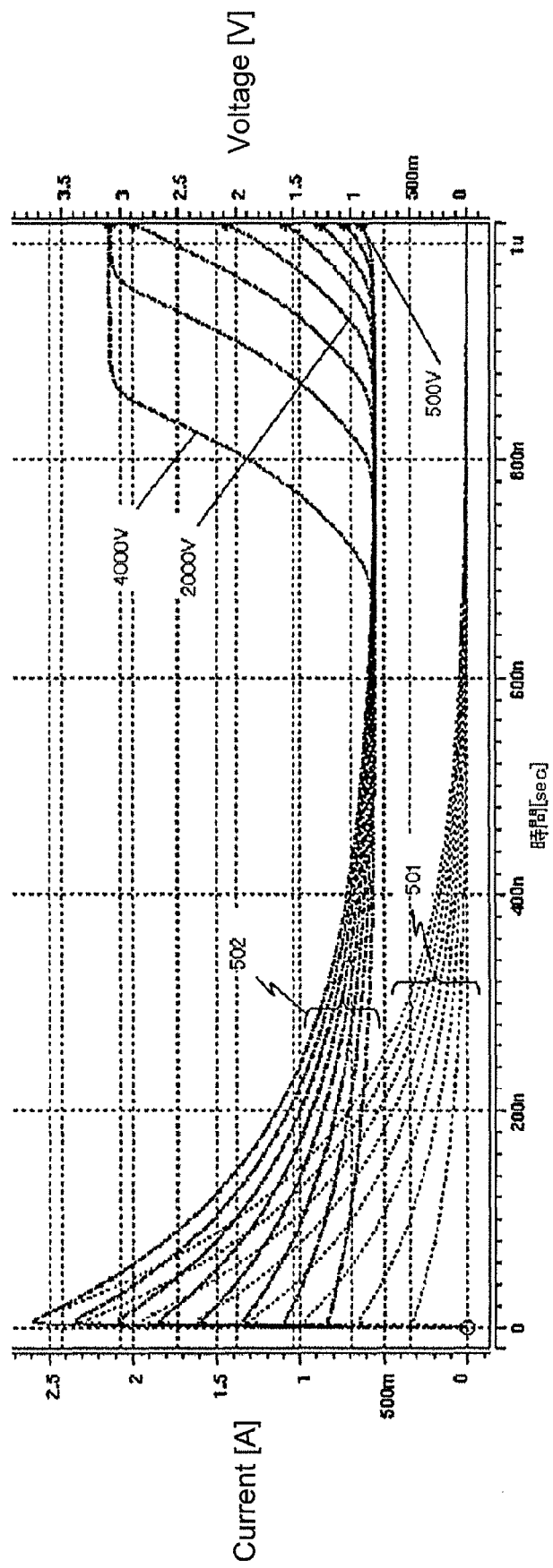
FIG. 8 is a graph showing current waveforms and voltage waveforms in the human body model in FIG. 1.

$f(C=2 \text{ pF}, R=100 \text{ k}\Omega) \approx 796 \text{ kHz}$ $f(C=4 \text{ pF}, R=300 \text{ k}\Omega) \approx 133 \text{ kHz}$ FIG. 8 is a graph showing the result of simulation of the current waveforms 501 in the human body model and voltage waveforms 502 in the electrostatic discharge protection circuit shown in FIG. 1. In this example, the capacitance value of the capacitor element 108 is 1 pF, and the resistance value of the impedance element 106 is 2 kΩ.

As shown in FIG. 8, the electrostatic discharge protection circuit shown in FIG. 1 is turned off after electric charges generated by electrostatic discharge are discharged sufficiently, and the voltage starts increasing. Although the maximum operating voltage of 2.5 V is exceeded, the breakdown voltage is not reached, and thus protection against electrostatic discharge is achieved.

2. Second Embodiment

Figure 2:
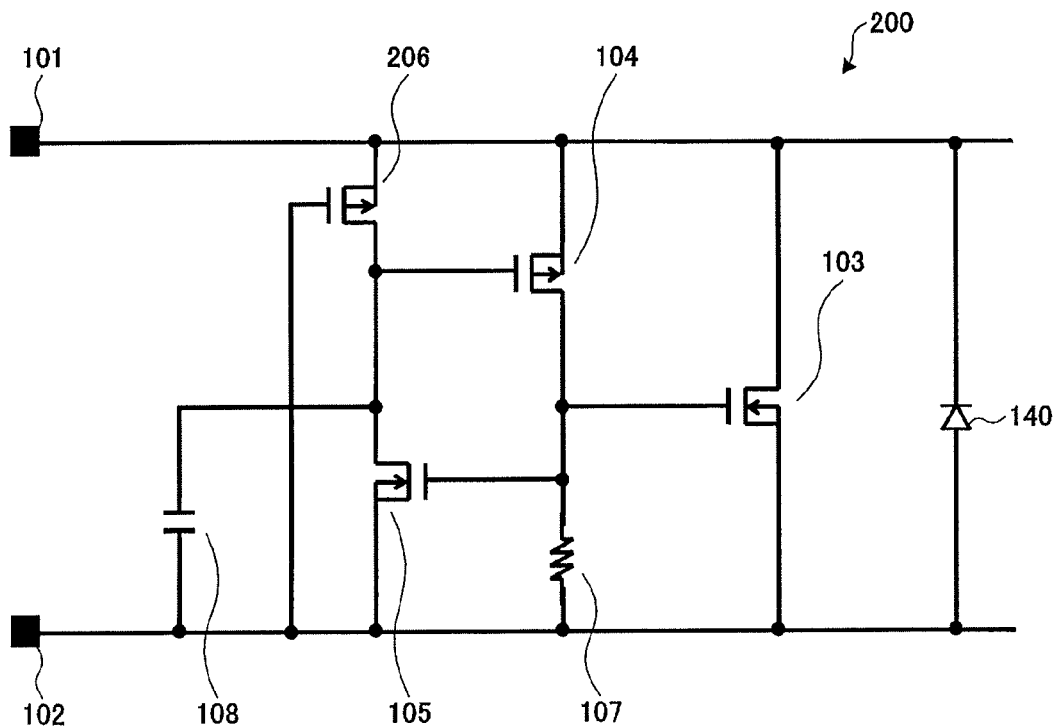
FIG. 2 is a diagram showing a configuration of an electrostatic discharge protection circuit according to a second embodiment of the invention.

FIG. 2 is a diagram showing a configuration of an electrostatic discharge protection circuit according to a second embodiment.

In the electrostatic discharge protection circuit of the second embodiment, reference numerals that are the same as those of FIG. 1 are given to constituent elements that are the same as those of the electrostatic discharge protection circuit of the first embodiment shown in FIG. 1, and descriptions thereof are omitted here.

In an electrostatic discharge protection circuit 200 according to the second embodiment, the first impedance element (106 in FIG. 1) may be constituted by a P-channel transistor 206 whose gate is connected to the second line (for example, power supply line) 102. In other words, it is possible to use a configuration obtained by, in the electrostatic discharge protection circuit 100 of the first embodiment shown in FIG. 1, replacing the resistive element 106 by the P-channel transistor (PMOS transistor) 206.

As a result of the first impedance element 106 being constituted by a MOS transistor, the potential of the first line 101 is reduced due to electrostatic discharge, and at the same time, the on-resistance of the P-channel transistor (PMOS transistor) 206 is also reduced, and therefore a situation does not occur in which the P-channel transistor (PMOS transistor) 104 is turned off during discharge of electric charges.

Figure 9:
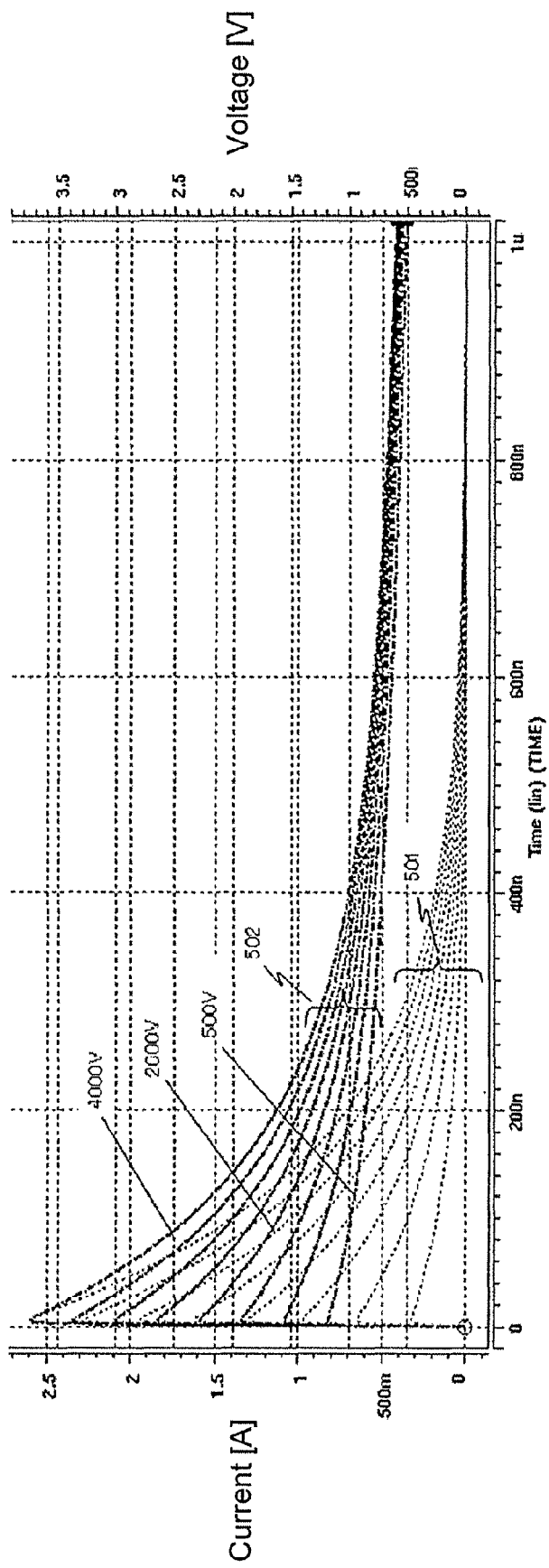
FIG. 9 is a graph showing current waveforms and voltage waveforms in the human body model in FIG. 2.

FIG. 9 is a graph showing the result of simulation of the current waveforms 501 in the human body model and voltage waveforms 502 in the electrostatic discharge protection circuit shown in FIG. 2. As shown in FIG. 9, in the electrostatic discharge protection circuit shown in FIG. 2, electric charges generated by electrostatic discharge are discharged sufficiently and exhaustively.

Also, as a result of the resistive element being replaced by the P-channel transistor (PMOS transistor) 206, the action of the P-channel transistor (PMOS transistor) 104 and the P-channel transistor (PMOS transistor) 206 with respect to production variations of the PMOS device is cancelled out, and it is therefore possible to achieve an electrostatic discharge protection circuit having small variations in the electrostatic discharge protection circuit characteristics.

3. Third Embodiment

Figure 3:
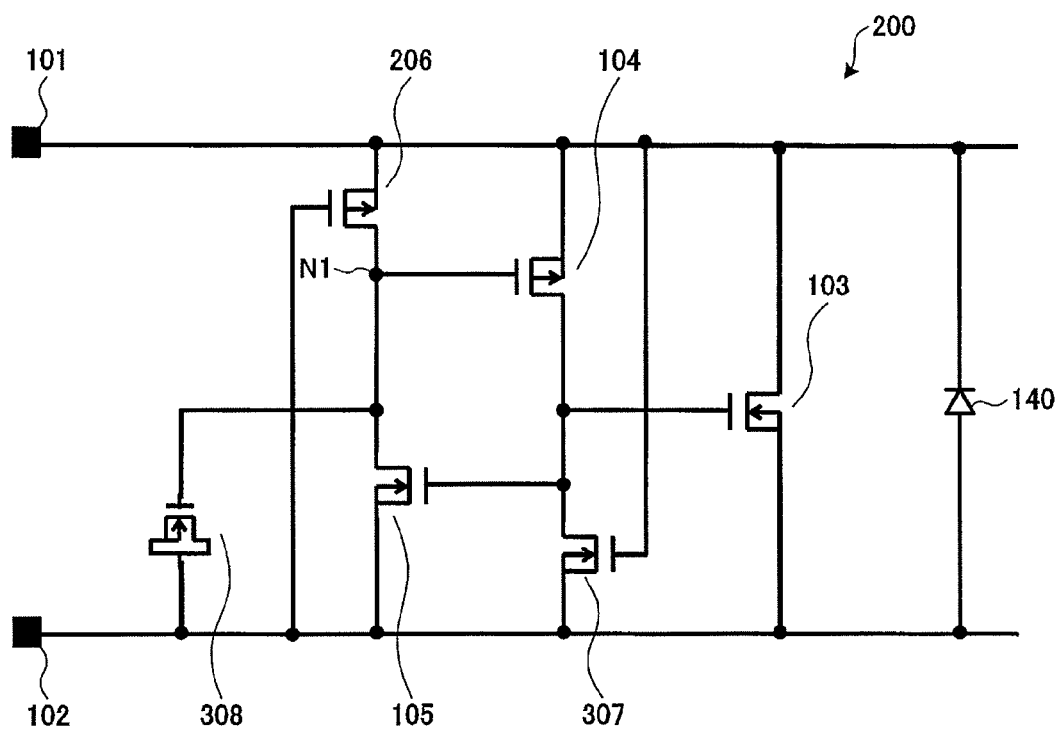
FIG. 3 is a diagram showing a configuration of an electrostatic discharge protection circuit according to a third embodiment of the invention.

FIG. 3 is a diagram showing a configuration of an electrostatic discharge protection circuit according to a third embodiment.

In an electrostatic discharge protection circuit 300 according to the third embodiment, reference numerals that are the same as those of FIGS. 1 and 2 are given to constituent elements that are the same as those of the electrostatic discharge protection circuit 100 of the first embodiment shown in FIG. 1 and the electrostatic discharge protection circuit 200 of the second embodiment shown in FIG. 2, and descriptions thereof are omitted here.

In the electrostatic discharge protection circuit 300 according to the third embodiment, the second impedance element (107 in FIGS. 1 and 2) may be constituted by an N-channel transistor whose gate is connected to the first line (for example, power supply line) 101. Also, the capacitor element (108 in FIGS. 1 and 2) may be constituted by an N-channel transistor whose gate is connected to the first node (N1). In other words, a configuration is used that is obtained by, in the electrostatic discharge protection circuit 200 of the second embodiment shown in FIG. 2, replacing the capacitor element 108 by an N-channel transistor (NMOS transistor) 308, and replacing the resistive element 107 by an N-channel transistor (NMOS transistor) 307.

As a result of the resistive element being replaced by the N-channel transistor (NMOS transistor) 307, the resistive element becomes unnecessary, and thus the cost can be reduced.

In addition, as a result of the capacitor element being replaced by the N-channel transistor (NMOS transistor) 308, it is possible to achieve an electrostatic discharge protection circuit having small variations in the electrostatic discharge protection circuit characteristics with respect to production variations of the gate thickness of the transistor. If the gate thickness becomes thick due to production variations, the gate capacitance of the N-channel transistor (NMOS transistor) 308 is reduced to reduce the capacitance value of the capacitor, and thus the cut-off frequency of the high-pass filter shifts in a higher direction. If, on the other hand, the gate thickness becomes thick due to production variations, the current capability of the P-channel transistor (PMOS transistor) 206 is reduced to increase the on-resistance, and the resistance value of the resistive element increases, and thus the cut-off frequency of the high-pass filter shifts in a lower direction. Accordingly, the action of the N-channel transistor (NMOS transistor) 308 and the P-channel transistor (PMOS transistor) 206 due to variations in the gate thickness during production process is cancelled out, and the influence on the characteristics of the electrostatic discharge protection circuit, or in other words, the influence on the ease of activation, is reduced.

In the electrostatic discharge protection circuit 300 of the third embodiment, all of the elements are constituted by MOS transistors of the same type (having equal Vth, etc.), and thus the electrostatic discharge protection circuit 300 of the third embodiment can be achieved without adding a new process step.

Also, as a result of the second impedance element 107 being constituted by the N-channel transistor (NMOS transistor) 307, it is possible to achieve an electrostatic discharge protection circuit in which the influence on the production variations of the gate thickness of the first N-channel transistor (for example, NMOS transistor) 105 and the N-channel transistor (NMOS transistor) 307 is small.

4. Fourth Embodiment

Figure 4:
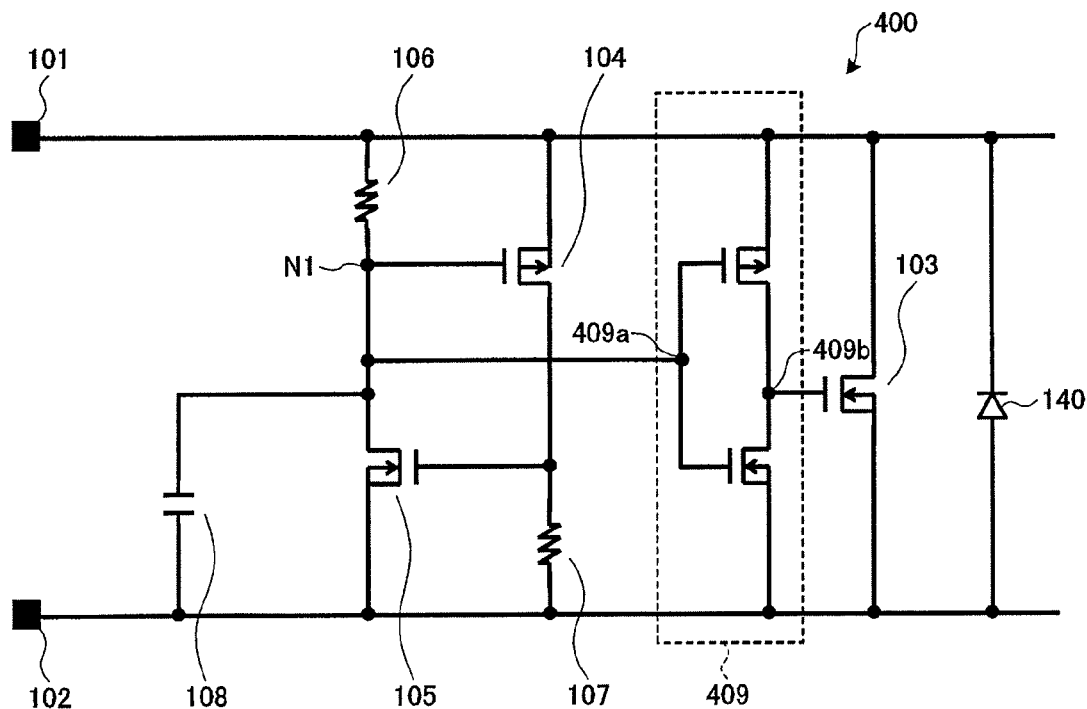
FIG. 4 is a diagram showing a configuration of an electrostatic discharge protection circuit according to a fourth embodiment of the invention.

FIG. 4 is a diagram showing a configuration of an electrostatic discharge protection circuit according to a fourth embodiment of the invention.

In an electrostatic discharge protection circuit 400 according to the fourth embodiment, reference numerals that are the same as those of FIG. 1 are given to constituent elements that are the same as those of the electrostatic discharge protection circuit 100 of the first embodiment shown in FIG. 1, and descriptions thereof are omitted here.

The electrostatic discharge protection circuit 400 of the fourth embodiment may further include an inverter circuit 409 whose input side 409a is connected to the first node (N1) and whose output side 409b is connected to the gate of the field effect transistor 103.

In the fourth step of the operations of the electrostatic discharge protection circuit of the first embodiment, at the timing when the first N-channel transistor 105 is turned on, the output of the inverter 409 reaches a high level, and the field effect transistor (NMOS transistor) 103 is turned on.

5. Fifth Embodiment

In an electrostatic discharge protection circuit according to the present embodiment, the resistance value R of the first impedance element 106 and the capacitance value C of the capacitor element 108 may be set to values that satisfy the following relationship:

$$10\ \text{MHz} < 1 \div (2\pi RC) < 100\ \text{MHz}.$$

In the above relational expression, the reason that $1 \div (2\pi RC)$ is set to less than 100 MHz is that the rise time in the human body model is approximately 10 nsec, which corresponds to a frequency of 100 MHz.

In the above relational expression, the reason that $1 \div (2\pi RC)$ is set to greater than 10 MHz is that consideration is given to the fact that the power supply rise time during normal operation is less than 100 nsec, which corresponds to a frequency of 10 MHz.

With this configuration, with respect to the electrostatic discharge when the rise time is 10 nsec or less, the electrostatic discharge protection circuit performs operation, and when the rise time is less than 100 nsec at the time of the activation of the power supply during normal operation, the electrostatic discharge protection circuit does not perform operation, and thus surge current does not occur.

The invention encompasses configurations that are substantially the same as those described in the embodiments and variations given above (for example, configurations having the same functions, methods and results, or configurations having the same objects and advantageous effects). The invention also encompasses configurations obtained by replacing a part that is not essential to the configurations described in the embodiments given above by another part. The invention also encompasses configurations that can achieve the same advantageous effects or the same objects as those described in the embodiments given above. The invention also encompasses configurations obtained by adding a known technique to the configurations described in the embodiments given above.

The entire disclosure of Japanese Patent Application No. 2013-000359, filed Jan. 7, 2013 is expressly incorporated by reference herein.

What is claimed is:

1. An electrostatic discharge protection circuit comprising:
    a first line having a first potential;
    a second line having a second potential that is different from the first potential;
    a trigger circuit connected between the first line and the second line; and
    a discharge circuit including a field effect transistor that is connected between the first line and the second line, whose gate is directly or indirectly connected to a predetermined connection node of the trigger circuit, and that conducts electricity by a change in a potential of the gate,
    wherein the trigger circuit includes a first circuit and a second circuit that are connected in parallel,
    the first circuit includes:
    a first impedance element on the first line side and a capacitor element on the second line side that are connected in series between the first line and the second line; and
    a first transistor of first conductivity type that is connected in series to the first impedance element and is connected in parallel to the capacitor element,
    the second circuit includes:
    a first transistor of second conductivity type on the first line side and a second impedance element on the second line side that are connected in series between the first line and the second line,
    a gate of the first transistor of second conductivity type is connected to a first node located between the first impedance element and the capacitor element,
    a gate of the first transistor of first conductivity type is connected to a second node located between the first transistor of second conductivity type and the second impedance element, and
    the predetermined connection node is the first node or the second node, and
    wherein the capacitor element is constituted by a fourth transistor of first conductivity type whose is connected to the first node.

2. The electrostatic discharge protection circuit according to claim 1,
    wherein the discharge circuit includes a second transistor of first conductivity type as the field effect transistor, and
    the second transistor of first conductivity type conducts electricity by an increase in a potential of the first node or the second node.

3. A semiconductor circuit device comprising the electrostatic discharge protection circuit according to claim 2.

4. The electrostatic discharge protection circuit according to claim 1,
    wherein the first impedance element is constituted by a resistive element.

5. A semiconductor circuit device comprising the electrostatic discharge protection circuit according to claim 4.

6. The electrostatic discharge protection circuit according to claim 1,
    wherein the second impedance element is constituted by a resistive element.

7. A semiconductor circuit device comprising the electrostatic discharge protection circuit according to claim 6.

8. The electrostatic discharge protection circuit according to claim 1,
    wherein the first impedance element is constituted by a second transistor of second conductivity type whose gate is connected to the second line.

9. A semiconductor circuit device comprising the electrostatic discharge protection circuit according to claim 8.

10. The electrostatic discharge protection circuit according to claim 1,
    wherein the second impedance element is constituted by a third transistor of first conductivity type whose gate is connected to the first line.

11. A semiconductor circuit device comprising the electrostatic discharge protection circuit according to claim 10.

12. The electrostatic discharge protection circuit according to claim 1, further comprising an inverter circuit whose input side is connected to the first node and whose output side is connected to the gate of the field effect transistor in the discharge circuit.

13. A semiconductor circuit device comprising the electrostatic discharge protection circuit according to claim 12.

14. The electrostatic discharge protection circuit according to claim 1,
wherein an impedance value of the first impedance element and a capacitance value of the capacitor element satisfy a predetermined condition that is set based on a relationship between the impedance value and the capacitance value that are set based on a power supply rise time during normal operation.

15. A semiconductor circuit device comprising the electrostatic discharge protection circuit according to claim 14.

16. A semiconductor circuit device comprising the electrostatic discharge protection circuit according to claim 1.

17. An electrostatic discharge protection circuit comprising:
 a first line having a first potential;
 a second line having a second potential that is different from the first potential;
 a trigger circuit connected between the first line and the second line; and
 a discharge circuit including a field effect transistor that is connected between the first line and the second line, whose gate is directly or indirectly connected to a predetermined connection node of the trigger circuit, and that conducts electricity by a change in a potential of the gate,
 wherein the trigger circuit includes a first circuit and a second circuit that are connected in parallel,
 the first circuit includes:
 a first impedance element on the first line side and a capacitor element on the second line side that are connected in series between the first line and the second line; and
 a first transistor of first conductivity type that is connected in series to the first impedance element and is connected in parallel to the capacitor element,
 the second circuit includes:
 a first transistor of second conductivity type on the first line side and a second impedance element on the second line side that are connected in series between the first line and the second line,
 a gate of the first transistor of second conductivity type is connected to a first node located between the first impedance element and the capacitor element,
 a gate of the first transistor of first conductivity type is connected to a second node located between the first transistor of second conductivity type and the second impedance element, and
 the predetermined connection node is the first node or the second node, and
 wherein the first impedance element is constituted by a second transistor of second conductivity type whose gate is connected to the second line.

18. An electrostatic discharge protection circuit comprising:
 a first line having a first potential;
 a second line having a second potential that is different from the first potential;
 a trigger circuit connected between the first line and the second line; and
 a discharge circuit including a field effect transistor that is connected between the first line and the second line, whose gate is directly or indirectly connected to a predetermined connection node of the trigger circuit, and that conducts electricity by a change in a potential of the gate,
 wherein the trigger circuit includes a first circuit and a second circuit that are connected in parallel,
 the first circuit includes:
 a first impedance element on the first line side and a capacitor element on the second line side that are connected in series between the first line and the second line; and
 a first transistor of first conductivity type that is connected in series to the first impedance element and is connected in parallel to the capacitor element,
 the second circuit includes:
 a first transistor of second conductivity type on the first line side and a second impedance element on the second line side that are connected in series between the first line and the second line,
 a gate of the first transistor of second conductivity type is connected to a first node located between the first impedance element and the capacitor element,
 a gate of the first transistor of first conductivity type is connected to a second node located between the first transistor of second conductivity type and the second impedance element, and
 the predetermined connection node is the first node or the second node, and
 wherein the second impedance element is constituted by a third transistor of first conductivity type whose gate is connected to the first line.

\* \* \* \* \*